US011113397B2

(12) United States Patent
Pevny et al.

(10) Patent No.: US 11,113,397 B2
(45) Date of Patent: Sep. 7, 2021

(54) DETECTION OF MALICIOUS EXECUTABLE FILES USING HIERARCHICAL MODELS

(71) Applicant: Cisco Technology, Inc., San Jose, CA (US)

(72) Inventors: Tomas Pevny, Prague (CZ); Jan Francŏ, Turnov (CZ); Petr Somol, Marianske Lazne (CZ)

(73) Assignee: Cisco Technology, Inc., San Jose, CA (US)

( * ) Notice: Subject to any disclaimer, the term of this patent is extended or adjusted under 35 U.S.C. 154(b) by 293 days.

(21) Appl. No.: 16/413,880

(22) Filed: May 16, 2019

(65) Prior Publication Data
US 2020/0364334 A1    Nov. 19, 2020

(51) Int. Cl.
*G06F 21/00* (2013.01)
*G06F 21/56* (2013.01)
*G06N 3/08* (2006.01)

(52) U.S. Cl.
CPC .......... *G06F 21/562* (2013.01); *G06F 21/567* (2013.01); *G06F 21/568* (2013.01); *G06N 3/08* (2013.01); *G06F 2221/033* (2013.01)

(58) Field of Classification Search
CPC .... G06F 21/562; G06F 21/568; G06F 21/567; G06F 2221/033; G06F 21/563; G06N 3/08
See application file for complete search history.

(56) References Cited

U.S. PATENT DOCUMENTS

| 8,689,331 | B2 | 4/2014 | Feeney et al. |
| 9,021,589 | B2* | 4/2015 | Anderson ............ G06F 21/566 |
| | | | 726/23 |
| 10,057,279 | B1* | 8/2018 | Balduzzi ................ G06F 21/56 |
| 10,375,143 | B2 | 8/2019 | Pevny et al. |

(Continued)

FOREIGN PATENT DOCUMENTS

| CN | 111291175 A | * | 6/2020 | |
| EP | 2860658 A1 | * | 4/2015 | ........... H04L 63/145 |

OTHER PUBLICATIONS

Jiang et al., "DLGraph: Malware Detection Using Deep Learning and Graph Embedding", 2018 17th IEEE International Conference on Machine Learning and Applications (ICMLA), Date of Conference: Dec. 14-20, 2018.*

(Continued)

*Primary Examiner* — Morshed Mehedi
(74) *Attorney, Agent, or Firm* — Behmke Innovation Group LLC; Kenneth J. Heywood; Jonathon P. Western

(57) ABSTRACT

In one embodiment, a device disassembles an executable file into assembly instructions. The device maps each of the assembly instructions to a fixed length instruction vector using one-hot encoding and an instruction vocabulary and forms vector representations of blocks of a control flow graph for corresponding functions of the executable file by embedding and aggregating bags of the instruction vectors. The device generates, based on the vector representations of the blocks of the control flow graph, a call graph model of the functions in the executable file. The device forms a vector representation of the executable file based in part on the call graph model. The device determines, based on the vector representation of the executable file, whether the executable file is malware.

20 Claims, 10 Drawing Sheets

(56) References Cited

U.S. PATENT DOCUMENTS

| | | | |
|---|---|---|---|
| 2017/0068816 A1* | 3/2017 | Cavazos | G06F 21/562 |
| 2018/0096145 A1* | 4/2018 | Krejdl | G06F 21/563 |
| 2019/0138722 A1* | 5/2019 | Krcal | H04W 12/12 |

OTHER PUBLICATIONS

Stiborek et al., "Multiple Instance Learning for Malware Classification", www.sciencedirect.com, May 5, 2017, 10 pages.

Zhao et al., "An Unknown Malware Detection Scheme Based on the Features of Graph", www.researchgate.net, Feb. 28, 2012, pp. 239-246.

Li et al., "Graph Matching Networks for Learning the Similarity of Graph Structured Objects", International Conference on Machine Learning 2019, https://arxiv.org/pdf/1904.12787.pdf, 18 pages.

"Multiple instance learning" online: https://en.wikipedia.org/wiki/Multiple_instance_learning, dated Apr. 12, 2019, printed Apr. 18, 2019, 4 pages, Wikimedia Foundation Inc.

Narayanan et al., Contextual Weisfeiler-Lehman Graph Kernel for Malware Detection, 2016 International Joint Conference on Neural Networks (IJCNN), Jul. 2016, IEEE pp. 4701-4708.

Narayanan et al., subgraph2vec: Learning Distributed Representations of Rooted Sub-graphs from Large Graphs, arXiv preprint arXiv:1606.08928, dated Jun. 29, 2016, 8 pages.

Davis et al., "Deep Learning on Disassembly Data", Black Hat USA 2015, 39 pages.

Nataraj et al., "Malware Images: Visualization and Automatic Classification", International Symposium on Visualization for Cyber Security (VizSec), Jul. 2011, 7 pages.

Al-Dujaili et al., "Adversarial Deep Learning for Robust Detection of Binary Encoded Malware", arXiv preprint arXiv:1801.02950, Mar. 25, 2018, 7 pages.

Pascanu et al., "Malware Classification With Recurrent Networks", 2015 IEEE International Conference on Acoustics, Speech and Signal Processing (ICASSP), Apr. 2015, IEEE, pp. 1916-1920.

Dahl et al., "Large-Scale Malware Classification Using Random Projections and Neural Networks", 2013 IEEE International Conference on Acoustics, Speech and Signal Processing, May 2013, IEEE, pp. 3422-3426.

Saxe et al., "Deep Neural Network Based Malware Detection Using Two Dimensional Binary Program Features", 2015 10th International Conference on Malicious and Unwanted Software (Malware), Oct. 2015, IEEE, pp. 11-20.

Pevny et al., "Using Neural Network Formalism to Solve Multiple-Instance Problems", arXiv preprint arXiv:1609.07257, Mar. 7, 2017, 8 pages.

Lukan et al., "PDF File Format: Basic Structure", Exploit Development, Infosec, https://resources.infosecinstitute.com/pdf-file-format-basic-structure/, May 6, 2018.

Yan et al., "LSTM-Based Hierarchical Denoising Network for Android Malware Detection", Hindawi, Security and Communication Networks, vol. 2018, Article 5249190, 19 pages.

Nguyen et al., "Auto-detection of sophisticated malware using lazy-binding control flow graph and deep learning" Abstract, ScienceDirect, Computers & Security, vol. 76, Jul. 2018, 3 pages.

* cited by examiner

DETECTION OF MALICIOUS EXECUTABLE FILES USING HIERARCHICAL MODELS

TECHNICAL FIELD

The present disclosure relates generally to computer networks, and, more particularly, to malware detection using executable file hierarchical models.

BACKGROUND

Malware can take many forms and presents a serious challenge to network security. For example, some malware seeks to exfiltrate sensitive data from its infected device, while other forms of malware may encrypt the data of the device and seeks a ransom to decrypt (i.e., ransomware), and further forms of malware is used to launch attacks on designated systems, such as denial of service (DoS) attacks. Malware is also becoming increasingly evasive, in an effort to avoid detection by antivirus software. Thus, in many cases, superficial analysis of a file under scrutiny may be insufficient to discern whether the file includes malware. However, a key observation herein is that analysis of the inner workings of a file, in a structured manner, can be effective to determine whether a given file contains malware.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
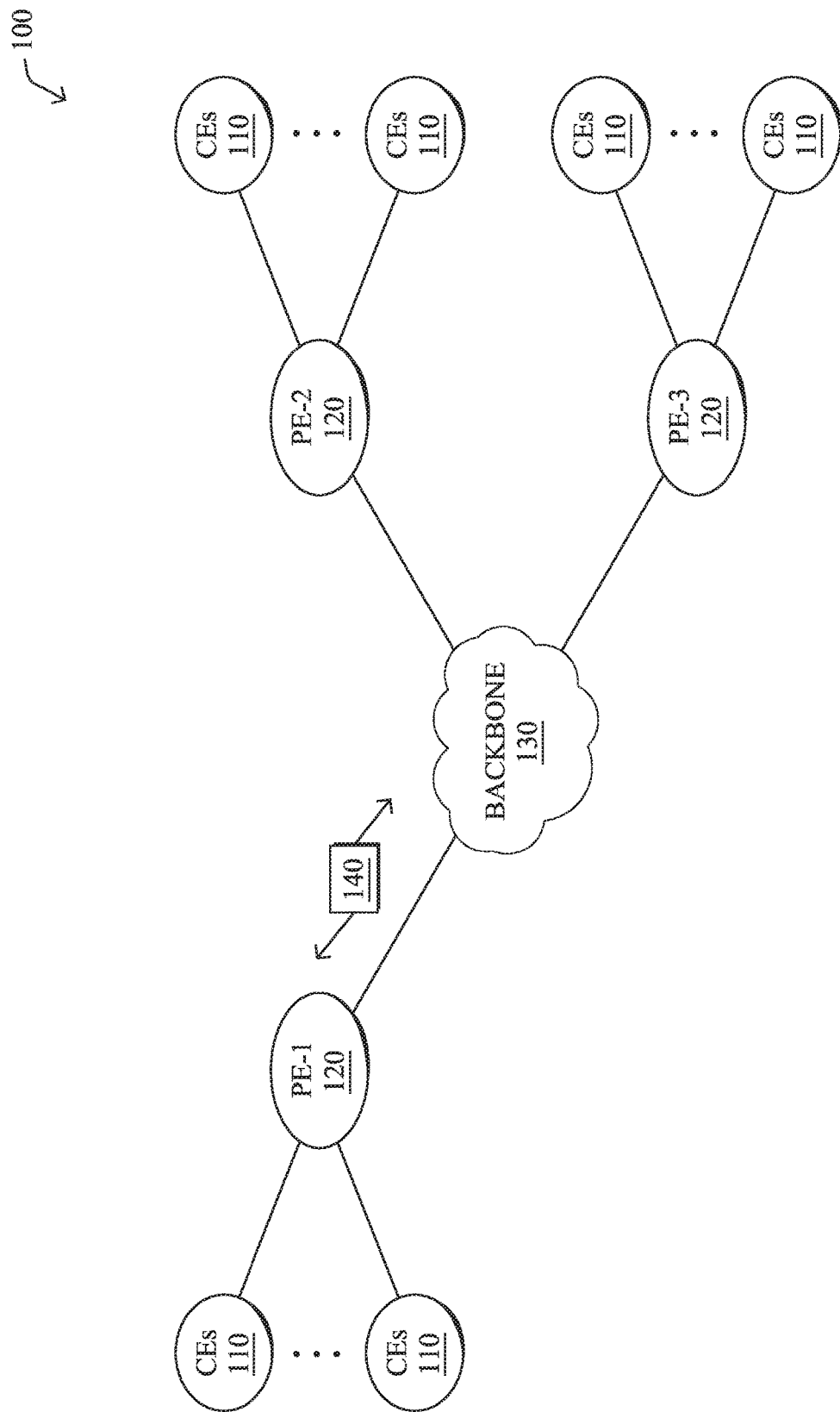
FIGS. 1A-1B illustrate an example communication network.

According to one or more embodiments of the disclosure, a device disassembles an executable file into assembly instructions. The device maps each of the assembly instructions to a fixed length instruction vector using one-hot encoding and an instruction vocabulary and forms vector representations of blocks of a control flow graph for corresponding functions of the executable file by embedding and aggregating bags of the instruction vectors. The device generates, based on the vector representations of the blocks of the control flow graph, a call graph model of the functions in the executable file. The device forms a vector representation of the executable file based in part on the call graph model. The device determines, based on the vector representation of the executable file, whether the executable file is malware.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using a single CE router with two links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
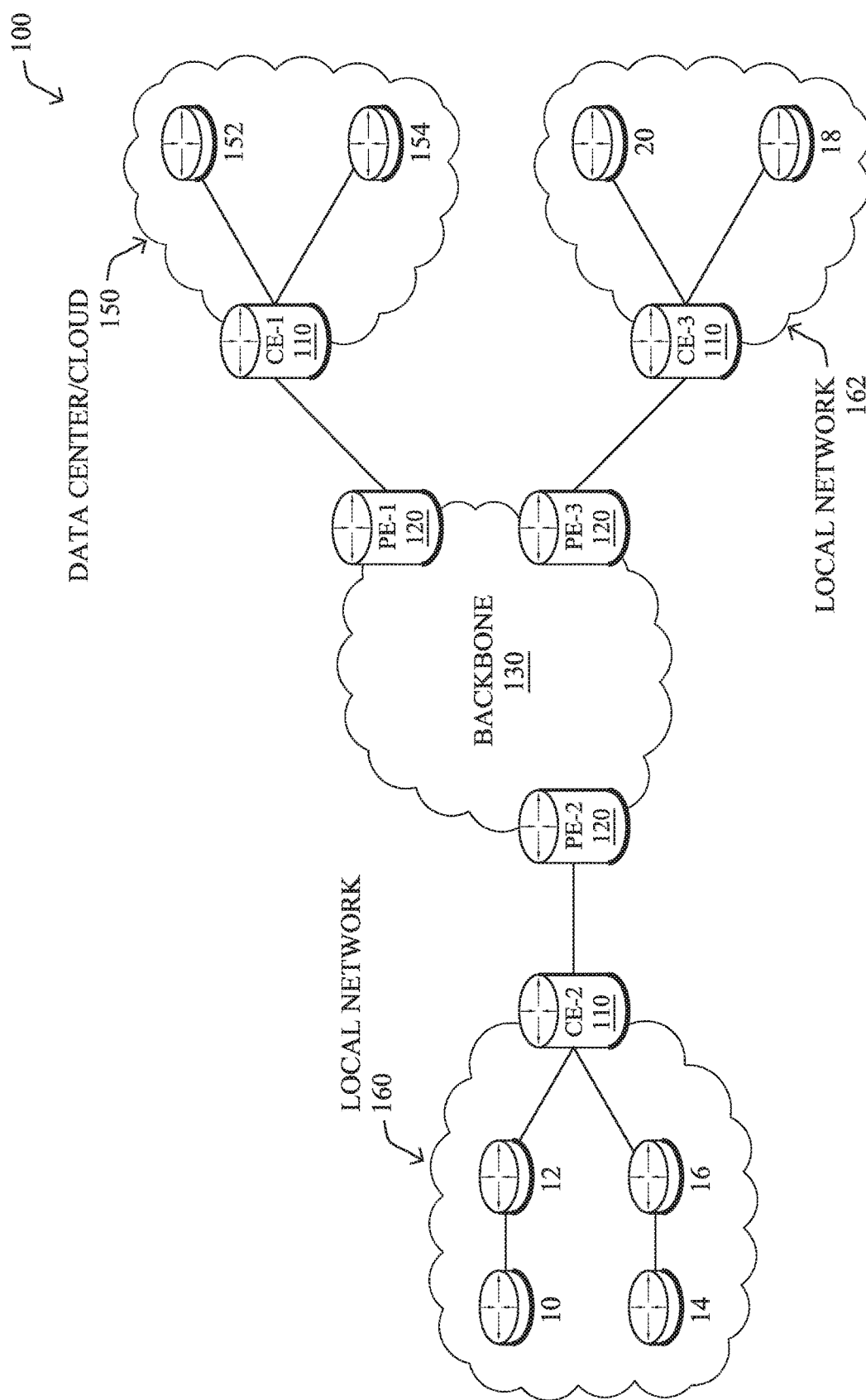

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
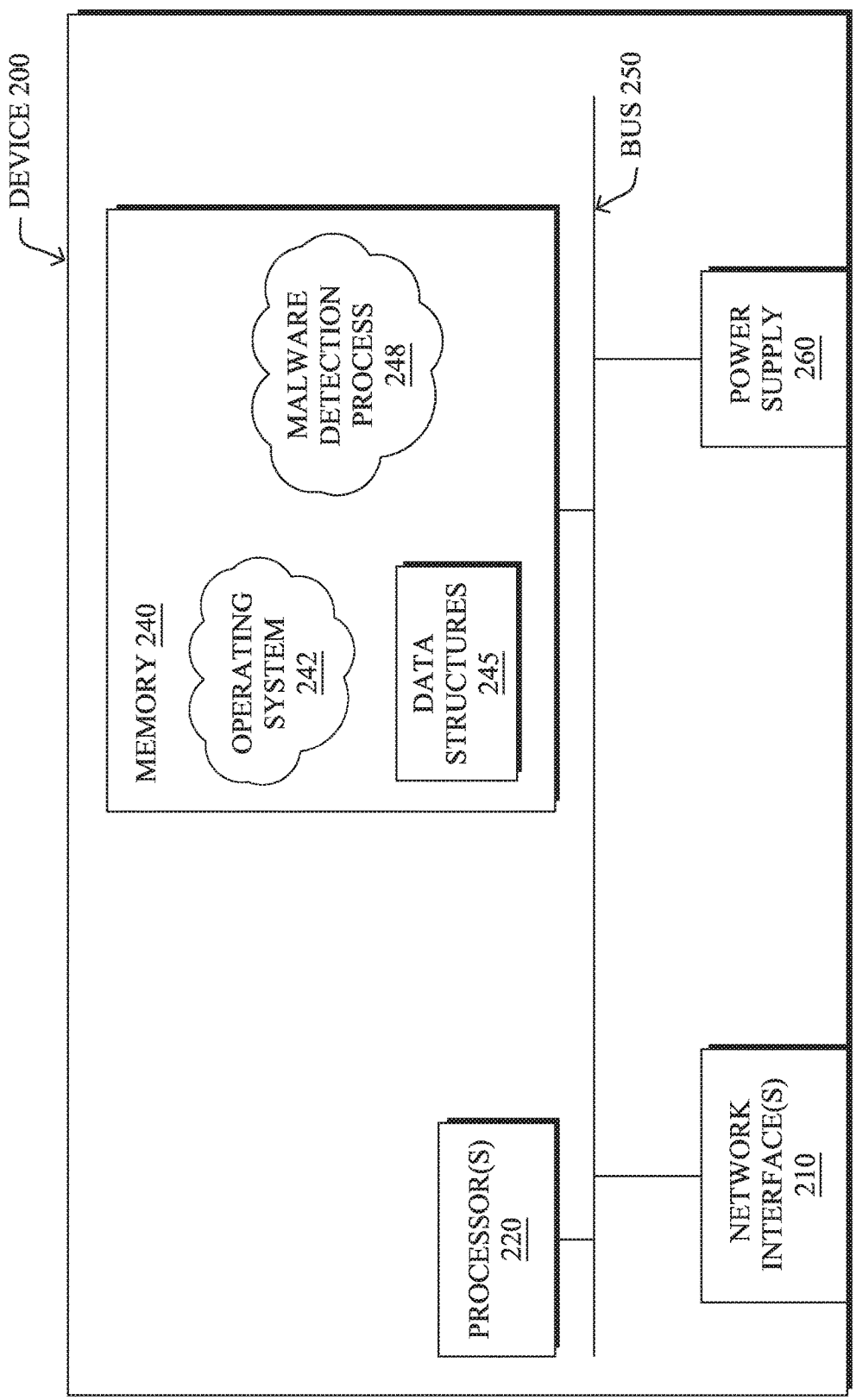
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a malware detection process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, malware detection process 248 may execute one or more machine learning-based classifiers to classify an executable file as malware or benign. To do so, malware detection process 248 may employ any number of machine learning techniques, to classify the executable file. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, network security process 248 can use the model M to classify new data points, such as information regarding new traffic flows in the network. Often, M is a statistical model, and the cost function is inversely proportional to the likelihood of M, given the input data.

In various embodiments, malware detection process 248 may employ one or more supervised, unsupervised, or semi-supervised machine learning models. Generally, supervised learning entails the use of a training set of data, as noted above, that is used to train the model to apply labels to the input data. For example, the training data may include data regarding an executable file that has been labeled as "normal/benign," or "malware." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that malware detection process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), other forms of ANNs including deep learning, replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of files that are incorrectly classified as malware. Conversely, the false negatives of the model may refer to the number of files that the model incorrectly classifies as normal/benign, when actually malware. True negatives and positives may refer to the number of files that the model correctly classifies as normal or malware, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, malware can take many forms and presents a serious challenge to network security. For example, some malware seeks to exfiltrate sensitive data from its infected device, while other forms of malware may encrypt the data of the device and seeks a ransom to decrypt (i.e., ransomware), and further forms of malware is used to launch attacks on designated systems, such as denial of service (DoS) attacks. Malware is also becoming increasingly evasive, in an effort to avoid detection by antivirus software. Thus, in many cases, superficial analysis of a file under scrutiny may be insufficient to discern whether the file includes malware.

Traditionally, malware detection has relied on antivirus software, whose capabilities are based on human experience to assess the maliciousness of a given executable. In other words, these systems rely on the human's ability to understand code, identify malicious patterns, and define malware signatures. However, as the number and types of malware continue to grow, this paradigm will soon become untenable.

Detection of Malicious Executable Files Using Hierarchical Models

The techniques herein introduce an approach to detecting malware that relies on the hierarchical modeling of an executable or other file under scrutiny. In some aspects, a hierarchical neural network model is introduced that is capable of detecting malicious executables on the basis of patterns automatically learned in their inner structure. To do so, each executable may be treated as groups/bags of data, where each bag may comprise lower level bags, thus creating a hierarchy. This can be applied at different levels, from individual instructions of an executable to a higher function level. The approach itself learns which patterns in the file structure signify maliciousness.

Specifically, according to one or more embodiments of the disclosure as described in detail below, a device disassembles an executable file into assembly instructions. The device maps each of the assembly instructions to a fixed length instruction vector using one-hot encoding and an instruction vocabulary and forms vector representations of blocks of a control flow graph for corresponding functions of the executable file by embedding and aggregating bags of the instruction vectors. The device generates, based on the vector representations of the blocks of the control flow graph, a call graph model of the functions in the executable file. The device forms a vector representation of the executable file based in part on the call graph model. The device determines, based on the vector representation of the executable file, whether the executable file is malware.

Illustratively, the techniques described herein may be performed by hardware, software, and/or firmware, such as in accordance with malware detection process 248, which may include computer executable instructions executed by the processor 220 (or independent processor of interfaces 210) to perform functions relating to the techniques described herein.

Operationally, the techniques herein propose learning a hierarchical model of an executable file, whose structure itself is hierarchical, meaning that such a file is divided into different sections and corresponding subsections. Furthermore, these chunks create an intricate structure by containing reference to each other, which the hierarchical model can also model. By employing the hierarchical structure of the file, a classifier can be trained to identify malware that shares the same internal structure.

As opposed to other binary file formats, such as bitmaps (.BMP) or text files (.TXT), the contents and overall structure of a binary executable file is much more intricate. In order to understand the behavior of an executable file, one can either execute it, also referred to as dynamic analysis, or interpret its raw bytes using software, also referred to as static analysis. The techniques herein are primarily focused on the latter form of analysis.

The first step of static analysis is to parse the header of the file. In the case of a Windows™ executable, this header is called its portable executable (PE) header. Generally speaking, the header of every executable must include information about the location of code (e.g., bytes of assembly instructions) and data (e.g., strings, images, other binary data, etc.). Additionally, the header of the executable file must provide the list of library functions to the operating system, that should be loaded with the file and, most importantly, the entry address that points to the first instruction of the executable to be run.

Although the header of an executable file includes a lot of information about the executable file, oftentimes this is not enough information to understand the innerworkings of the executable. Therefore, additional analysis is needed, such as by disassembling the code into a more interpretable form, using a disassembler. In an ideal case, a decompiler could also be used to extract the original code. However, this does not always yield clear results because the executable file is either missing the information needed for such reconstruction or the information is corrupted. Thus, while disassembling an executable is relatively reliable, fully decompiling the file is not.

If successful, the disassembler returns a list of assembly instructions contained in the code section of the binary. Due to conditional branching and cycles, the instructions may be grouped into so called "basic blocks," whose dependencies can be expressed as a graph called the control flow graph. Furthermore, the instructions can be grouped at a higher level into functions, whose dependencies, i.e., who called who are expressed using a so-called call graph. On top of that, the disassembler can also provide cross-references between code and data. An example of such reference is a link between an instruction and the address of a string in the data section, which indicates that the string is being manipulated at some specified position.

Figure 3A:
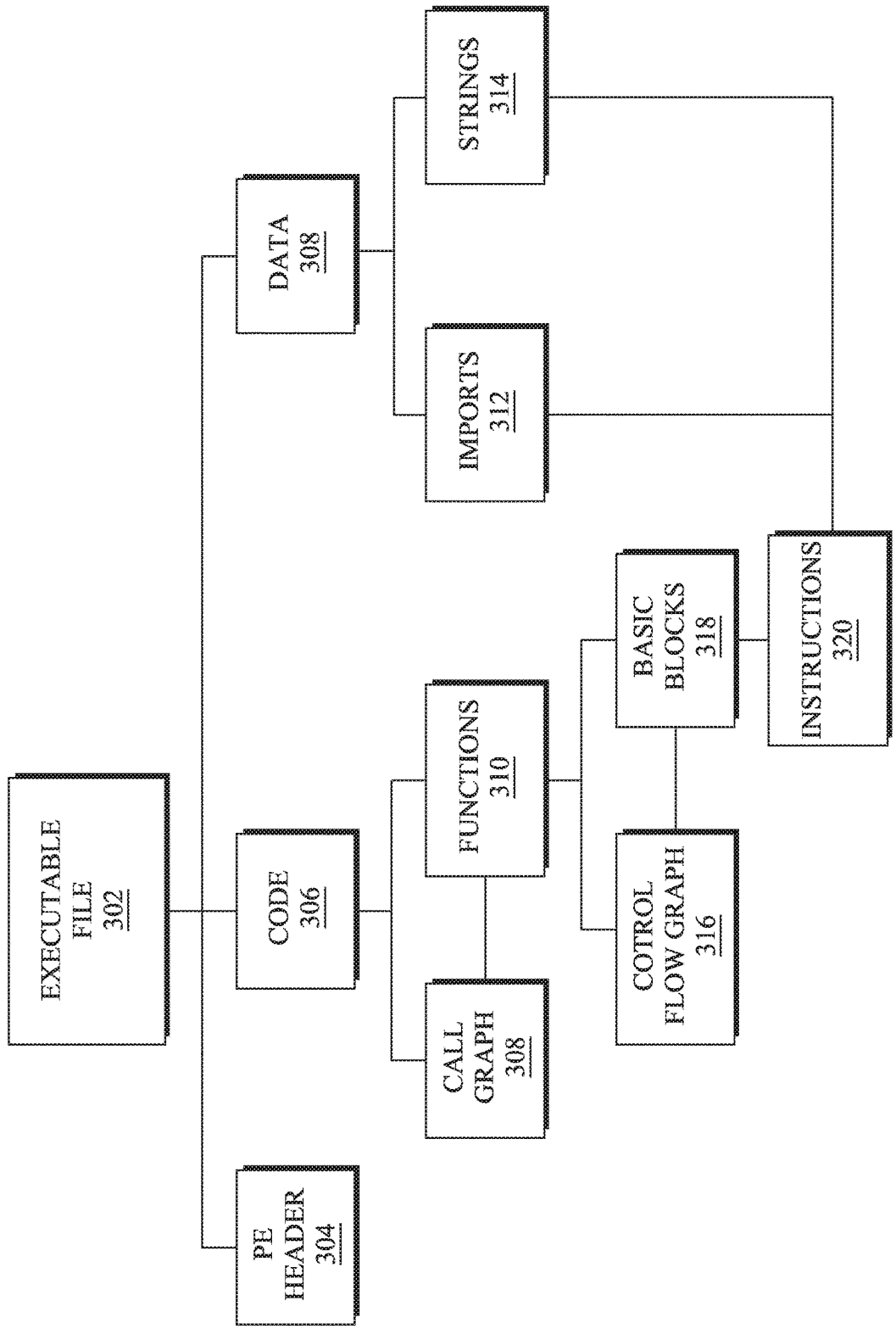
FIGS. 3A-3C illustrate examples of the hierarchy of an executable file.
Figure 3B:
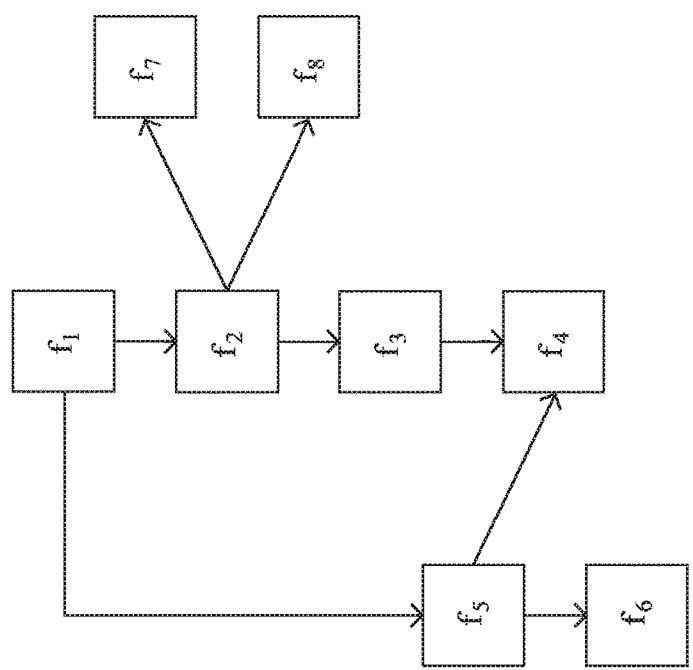
Figure 3B:
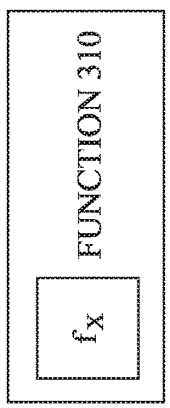
Figure 3C:
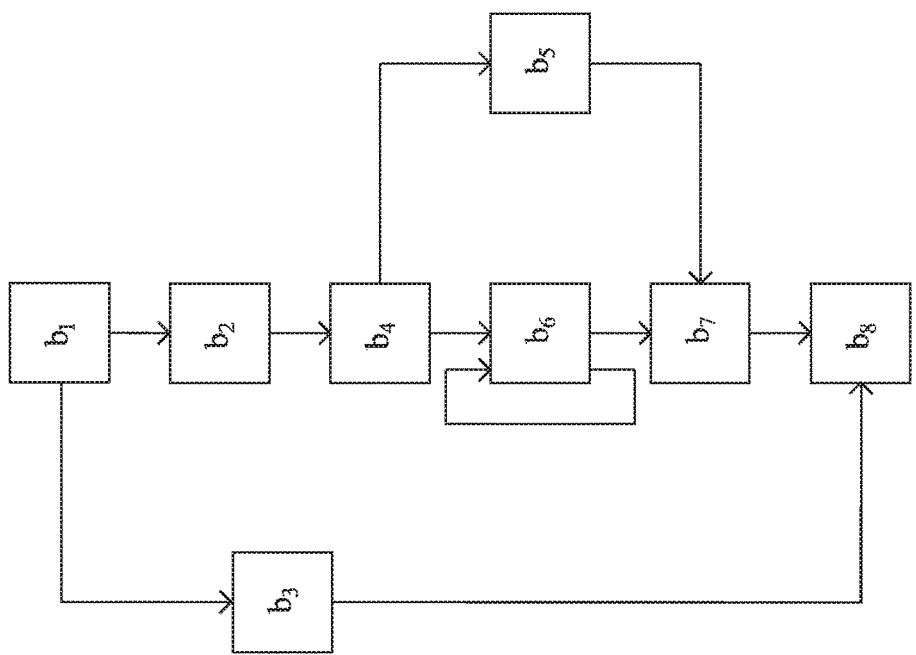
Figure 3C:
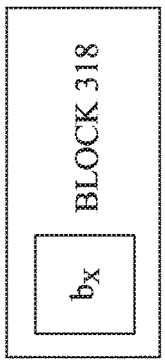

FIGS. 3A-3C illustrate examples of such an executable file hierarchy, according to various embodiments. FIG. 3A shows an example of an executable file 302, which may include three distinct components: a portable executable (PE) header 304, code 306, and data 308. At the basest level, code 306 may include assembly instructions 320 that can be grouped into basic blocks 318 of code, whose relations can be stored in control flow graph 316 of functions 310. In turn, functions 310 may be formed from these basic blocks 318 and control flow graph 316, whose relations can be stored in call graph 308 of code 306.

In addition to how code 306 is structured, the specific data 308 of file 302 may include imports 312 (e.g., references to libraries, etc.) and strings 314 that can be referenced from instructions 320. The PE header 304 of executable file 302 may also include useful information about executable file 302.

FIG. 3B illustrates an example portion of call graph 308 comprising functions 310. As shown, the functions of the executable file may be interrelated, creating dependencies that can be represented in call graph 308.

Similarly, FIG. 3C illustrates an example portion of control flow graph 316 for each function in call graph 308. As shown, the blocks 318 of instructions may also be interrelated, and their dependencies captured in the model of control flow graph 316. In other words, for each part of the structure of the executable file, there may be a counterpart model/transformation that can capture it.

According to various embodiments, malware detection process 248 may implement a multiple instance learning framework, in combination with neural networks, to encode the aforementioned structure and learn from it. These types of models have proven to be very effective when dealing with hierarchical data.

As a first step, malware detection process 248 may disassemble an executable file into its base instructions. These obtained instructions are most commonly in the form of mnemonics, which outline the purpose of the instruction. For example, the instruction "jump 0x1000234d" instructs the processor to jump with the execution to the given address, 0x1000234d.

In order to model the instructions, malware detection process 248 may encode the instructions into numerical values, in various embodiments. This can be achieved by first constructing a set of unique instructions in the available executable file(s). In other words, malware detection process 248 may first assess the various instructions from the file and build a vocabulary from these instructions. Doing so allows malware detection process 248 to enumerate the set and create a mapping from strings to numbers. In this way, the encoding captures already seen instructions. However, in subsequent use, such as in the case of a complete model for classifying any number of binaries, malware detection process 248 may also be configured to identify a new instruction that is outside of its known vocabulary and may take tag it with a 'new instruction' tag, to assign the same number to each instruction that matches the newly discovered instruction.

Since even in a single binary there can be up to thousands of unique instructions, the techniques herein propose that malware detection process 248 perform the following: 1.) group the instructions with the same general function and 2.) use a thresholding on instruction frequency, so that rarely encountered instructions can all be grouped under the new instruction tag. For example, process 248 may transform the instruction "jump 0x1000234d" obtained from its disassembler into the form "jump address," allowing process 248 to group this instruction with other jump instructions. Both of these actions allow for the reduction in computational complexity of modeling the executable file and can also reduce noise in the data, as well. Regarding the occurrence/frequency measure, process 248 can either count how many times a given instruction has been observed in the sample set or the number of binaries in which the instruction was encountered. The advantage of the latter approach is the fact that it better captures the notion of a rare instruction in a sample executable file.

In various embodiments, malware detection process 248 may extend the above mapping to create vectors of fixed length for each instruction. For example, malware detection process 248 may use one-hot encoding, which returns a zero vector of size (vocabulary size+1) with a 'one' at the place given by the enumeration. In other words, each instruction in the vocabulary may correspond to a single bit of the vector and malware detection process 248 may set the proper bit in the vector for each instruction in the executable file.

In further embodiments, malware detection process 248 may also take into account the links found within an executable file. Indeed, every time an instruction manipulates an address, a link between the instruction and the target destination is made. These links are very powerful features that can be used to form a vector representation of the file for purposes of both training a malware detector and applying such a model to a file under scrutiny. However, links are also very sparsely available, as most of the values in registers and on the stack at a given instruction are known only at runtime. Accordingly, malware detection process 248 may capture either or both of the following link types from the disassembled code: 1.) links that reference a string and 2.) links that call an external library function.

Classification of executable files based on discovered printable characters contained in the data may be quite effective for purposes of making a malware determination. For example, the Petya ransomware contains strings such as "Ooops, your important files are encrypted.\r\n\r\n." However, a key aspect of the techniques herein is that malware detection process 248 may also capture and assess the context of where such a string was referenced in the executable. Since the string references are not present with each instruction, malware detection process 248 may use a simple encoding based on histogram of n-grams of characters, where the output dimension is much lower than that of instruction encoding, which reduces the overall computational cost. Doing so means that encoding of a missing string reference feature would return a zero vector of appropriate size. Note that this is an inexpensive way to deal with missing values. In further embodiments, the distribution of values in those vectors can also be learned from the data, so that if a string is missing a reference, it will get replaced by some mean value that has been inferred from the data and potentially better suit the model. However, the main disadvantage of this approach is the additional computational cost.

Although a call to an external library function could also be regarded as an instruction, the vocabulary-based instruction encoding approach introduced above will often strip the library name, due to the limited size of the vocabulary. Moreover, there are cases where the address of the target function is not directly available, since it may be stored in a register. However, with some limitations, malware detection process 248 may be able to track the value to a previous instruction and link the callee name there, thus further enhancing the context. At each instruction, which contains such link to an external library functions malware detection process 248 may store the name of the function encoded with the same histogram of n-grams of characters encoding, as with strings references. The treatment for encoding missing information also applies here.

The framework is flexible enough to incorporate other features, in further cases. For example, malware detection process 248 may also capture references to other resources, as well, such as stored icons or other binary data. However, these may be much harder to obtain.

Figure 4:
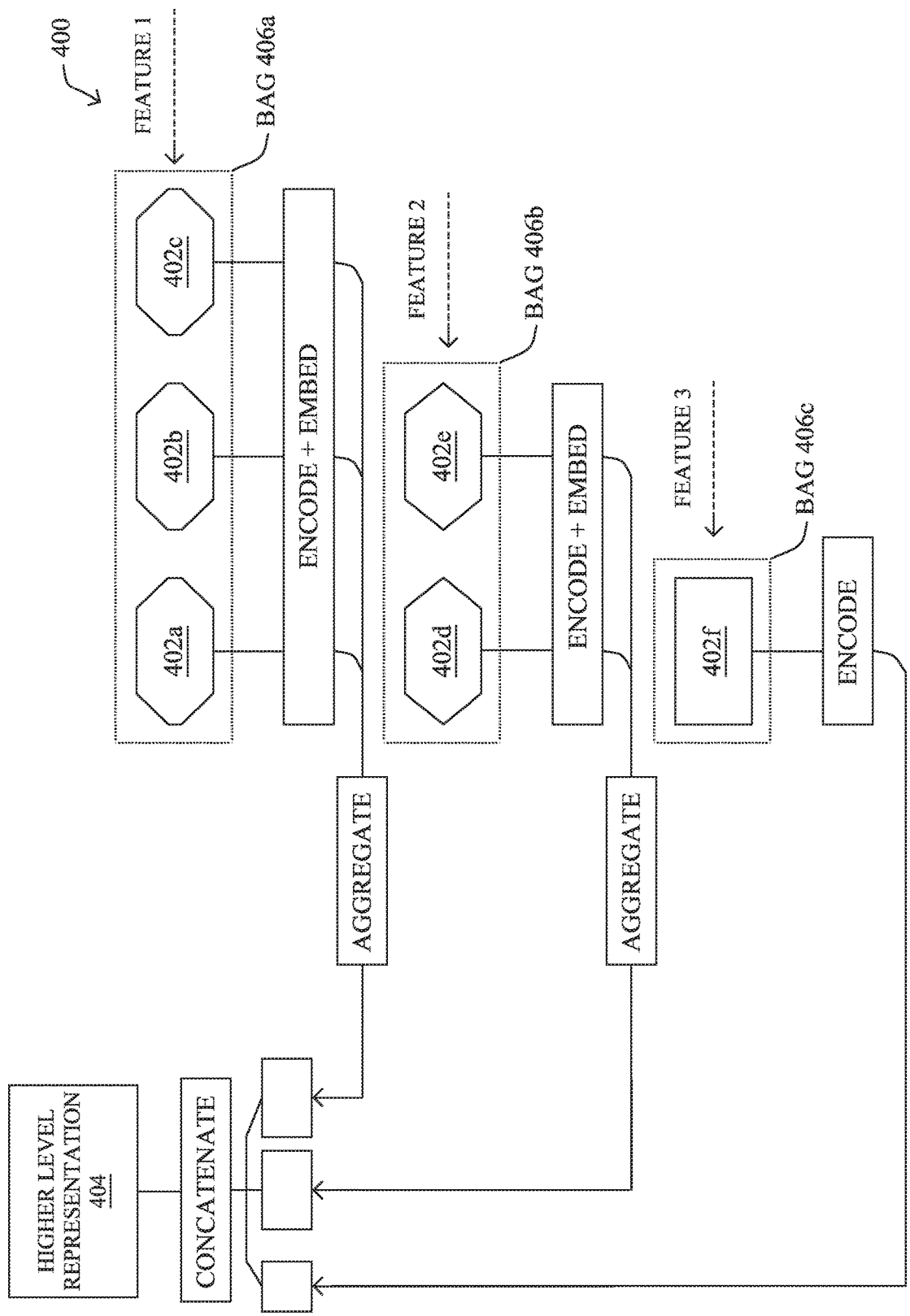
FIG. 4 illustrates an example diagram of the formation of a higher level representation of a file.

According to various embodiments, a key aspect of the techniques herein is that malware detection process 248 combines features from the disassembled executable file into a higher level of its hierarchical representation of the file. FIG. 4 illustrates an example diagram 400 of the formation of such a higher level representation. In general, the approach shown in diagram 400 can be applied multiple times to the file, to construct higher and higher level representations of the file (e.g., modeling the control flow graph, then the call graph, etc.).

The framework shown in diagram 400 allows malware detection process 248 to easily combine both the primary instruction features with secondary features (e.g., strings, function names), to create the representation of the whole basic block (e.g., a block 318). Since this hierarchy level reduction is a reoccurring feature of the proposed model, it will be described quite generally, at first.

As shown, malware detection process 248 may first encode bags 406*a*-406*c* with multiple instances, such as instances 402*a*-402*f*. Once each feature is encoded, malware detection process 248 may then embed each feature using its feature-specific embedding and aggregate the results, to form the higher-level representation 404 (e.g., a new, combined vector). Recalling the missing feature treatment described above, in cases where the lower level feature has no instances, the encoding may return a zero vector of given size. In various embodiments, to perform the embedding, malware detection process 248 may use a neural network, which it applies to each instance individually and whose weights are learned from the data. In the case of non-repeated and simple features, such as in the case of instance 402*f* shown, the embedding is usually omitted. Also note that, when dealing with numeric data, the encoding is not strictly necessary, and can be omitted, as desired. However, in most cases the data needs to be at least normalized.

To form block representations of the instructions of an executable file, malware detection process 248 may embed and aggregate the bags of instructions using one of two different approaches. In a first embodiment, malware detection process 248 may learn the transformation from the dataset. To do so, malware detection process 248 may concatenate the sequence of one-hot vectors of instructions and process them using a two-dimensional convolution neural network with aggregation, such as max, mean, mean-max, or the like. In another embodiment, malware detection process 248 may instead use a predefined embedding and aggregation of instructions into a block. For example, malware detection process 248 may use just the enumeration of instructions and count the number of occurrences of sequences of length n, which is sometimes referred to as a histogram of n-grams approach. Under this approach, preliminary testing has shown that a window size of 2 or 3 has proven to be effective.

Modification of both transformation approaches above are also possible, in various embodiments. For example, malware detection process 248 may alternatively use a recurrent neural network, other form of neural network, or a different hash function in lieu of n-grams. On one hand, the second approach has the benefit of a much lower computational cost because it replaces the transformation of the lowest level of the hierarchy with a predefined transformation, which also happens to be the most populous level of the hierarchy. On the other hand, using the first approach would yield a transformation better suited to the data.

In cases in which malware detection process 248 also considers the secondary features of the executable file, such as string references and callee names, malware detection process 248 may lower the computational cost considerably by using a predefined transformation for both features. For example, in one embodiment, malware detection process 248 may use identity embedding and element-wise sum aggregation, to transform the histograms of n-grams of characters of each instance to a block level histogram.

Once the output vectors of instruction, string references and callee names are computed, malware detection process 248 may concatenate them into the higher level representation 404, in order to be processed by the next level in the hierarchy that deals with modeling the control flow graph.

Figure 5:
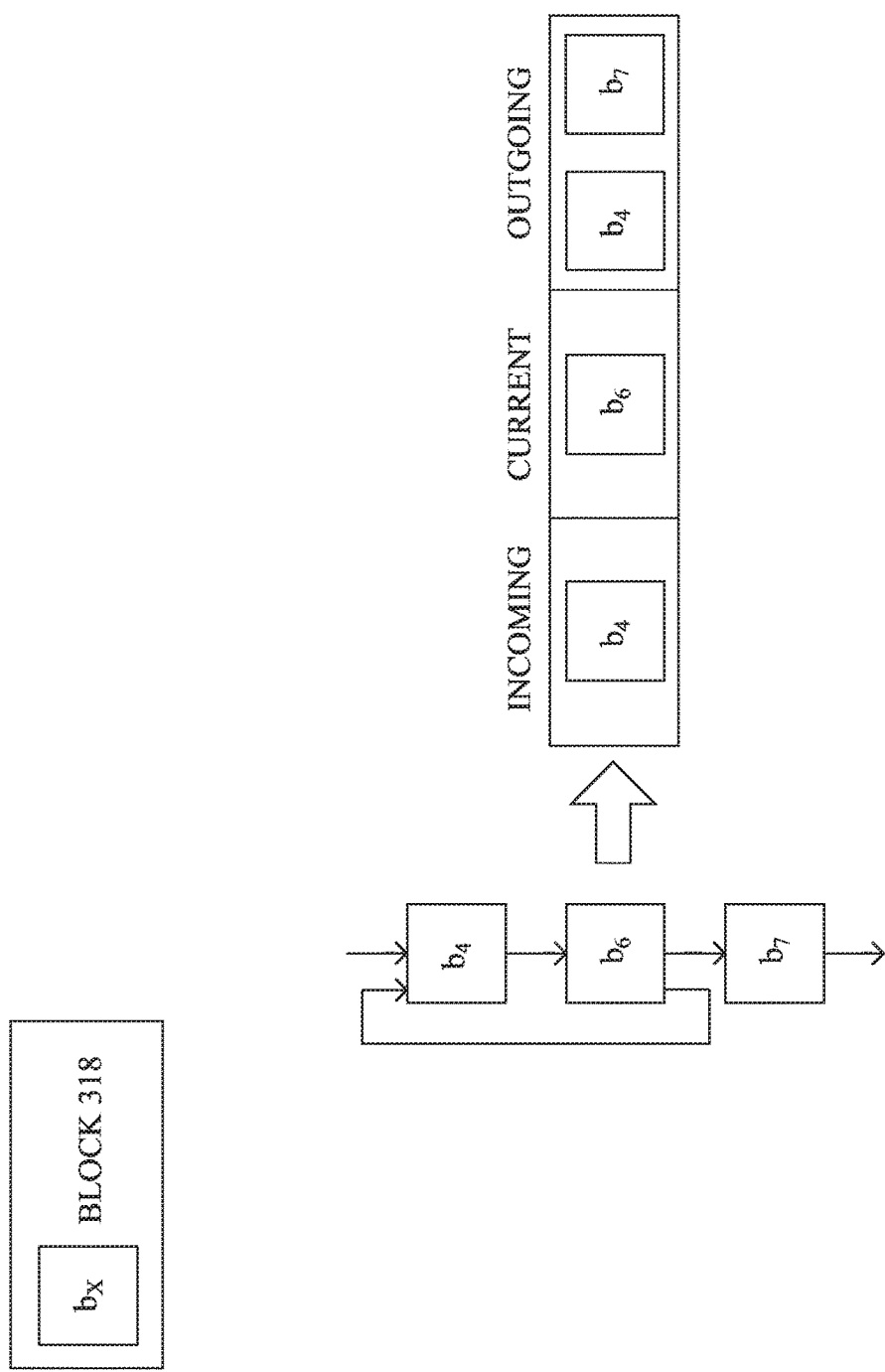
FIG. 5 illustrates an example of the formation of a block wrapper.

As would be appreciated, the multiple instance learning-based approach introduced herein allows malware detection process 248 to model the structure of any directed graph and, thus, also the control flow graph of the executable file. In various embodiments, malware detection process 248 may do so by constructing neighborhood wrappers for the formed block representations. For example, as shown in FIG. 5, assume that the modeled control flow graph of the executable includes blocks 318, such as $b_4$-$b_7$. In such a case, malware detection process 248 may form neighborhood wrapper 500 for block $b_6$ with three partitions: the first one contains bag of vectors representing the incoming block(s), the second one vector representing the specific block around which the wrapper is created, and the third partition contains bag of outgoing blocks. Incoming blocks are those who have the specific block for neighbor and the outgoing blocks are the neighborhood of the specific block. For example, as shown, wrapper 500 may indicate that the incoming block for block $b_6$ is block $b_4$ and its outgoing blocks are $b_4$ and $b_7$.

Using the neighborhood wrappers for the blocks, malware detection process 248 may apply the same general framework shown in FIG. 4 to these wrappers. More specifically, the model takes as an input the bags of the neighborhood wrappers and treats the incoming, current, and outgoing block representations as separate features, which are processed in the same way as in the general reduction step, i.e. encode, embed, and/or aggregate, as needed. This also enables the addition of features, such as edge type, whose encoding can be concatenated with the block representation.

By now the pattern should be clear, the function representation is constructed by embedding the block wrappers representations and aggregating their results into one vector that represents the whole function. Again, malware detection process 248 can enrich (i.e., append) the vector representation at this level by taking into the account information such as return type, argument types, and/or calling convention of a given function.

The general idea of graph representation is applied here in the same way as in the case of the control flow graph, but now with the call graph, i.e., a function representation from the control flow graph model is wrapped with the representations of its incoming and outgoing functions. As a result, malware detection process 248 now has one vector that, in theory, should provide some distilled information about the whole control flow of the executable binary file. Before the final classification layer (e.g., classifier 660 shown in FIG. 6), malware detection process 248 can further expand the resulting vector with information from all strings of given binary and even some features from its PE header, leading to a more robust model of the executable.

Figure 6:
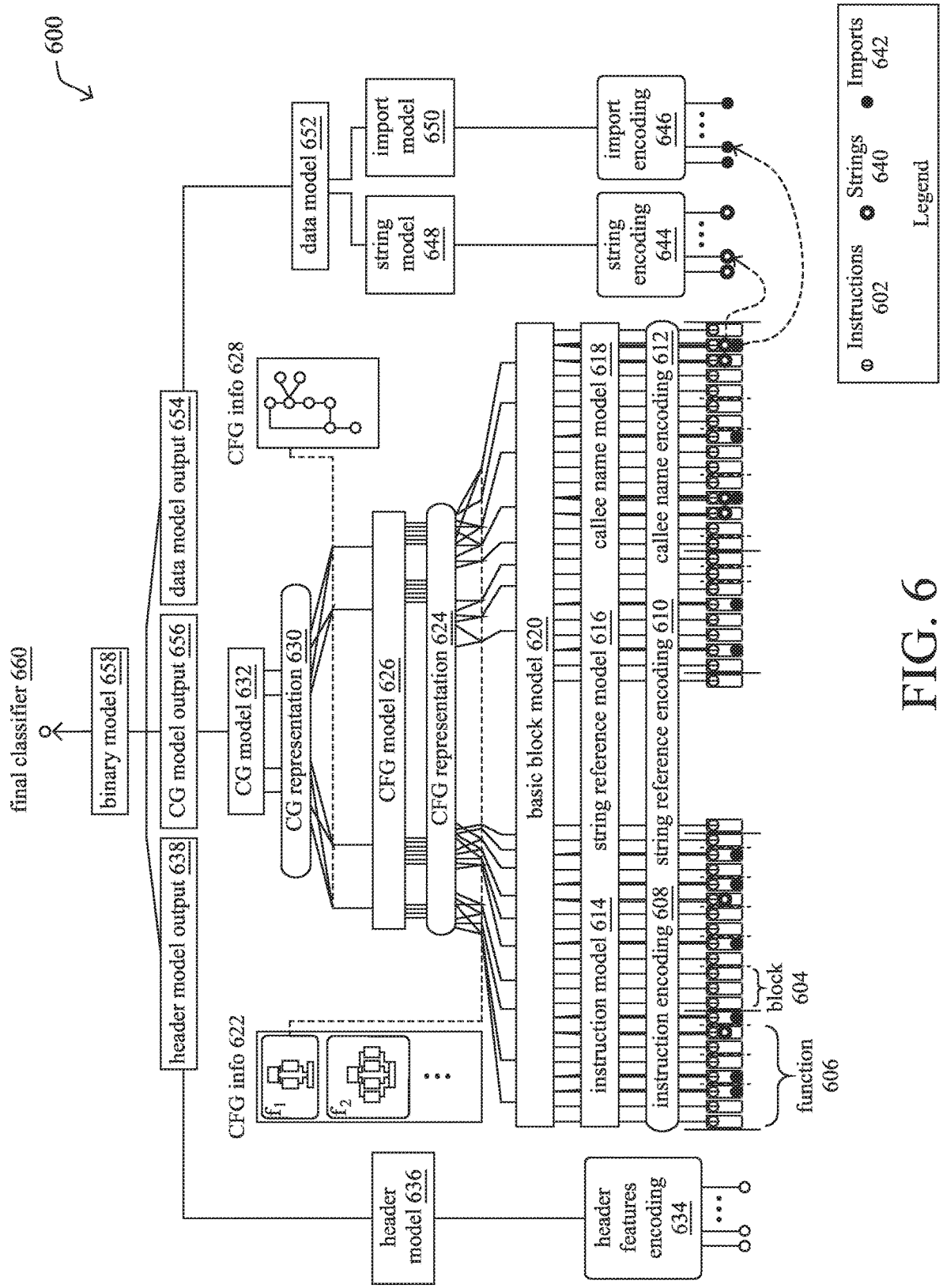
FIG. 6 illustrates an example architecture for modeling the hierarchical structure of an executable file.

FIG. 6 illustrates an example architecture 600 for modeling the hierarchical structure of an executable file, according to various embodiments. As shown, and detailed above, malware detection process 248 may begin by disassembling the executable file and identifying instructions 602 which can correspond to blocks and functions. Block 604 illustrates an example of such a block and function 606 illustrates an example of such a function, respectively. For example, to form the block representations (e.g., vectors), malware detection process 248 may apply instruction encoding 608 to instructions 602, such as in accordance with a defined vocabulary and embedding using instruction model 614. Similarly, malware detection process 248 may apply string reference encoding 610 to any strings associated with instructions 602, to form representations of string references using string reference model 616, and apply callee name encoding 612 to any library calls in instructions 602, to form the representation of callees using callee name model 618.

In turn, malware detection process 248 may embed and aggregate the output vectors of models 614-618, to form a basic block model 620 for each block of instructions 602. By combining these block representations with control flow graph (CFG) information 622 (e.g., how the blocks are related), malware detection process 248 can form CFG representation 624.

Once malware detection process 248 has formed a representation of the control flow graph of each function in the file, it may use call graph (CG) information 628 to form an even higher level representation 630 of the call graph, thereby modeling the call graph as model 632. As detailed above, malware detection process 248 may form neighborhood function wrappers from the output of CFG model 626 and apply the same general process of encoding, embedding, and aggregating to these wrappers, to form CG model 632.

According to various embodiments, malware detection process 248 may similarly model the (PE) header information of the executable file. For example, as shown, malware detection process 248 may apply a header feature encoding 634 to the header information, resulting in a header model 636.

Malware detection process 248 may further model the data found within the executable file, in further embodiments. For example, malware detection process 248 may apply string encoding 644 to the strings 640 extracted from the file, to form string model 648 and apply import encoding 646 to the imports 642 (e.g., callee/library information), to form import model 650. Malware detection process 248 can then aggregate models 648-650 into a single data model 652.

From the resulting outputs 638, 656, 654 from header model 636, call graph (CG) model 632, and data model 652, respectively, malware detection process 248 can then form the finalized model 656 for the entire executable binary file.

Once malware detection process 248 has formed the final vector representation (e.g., model 658) of the entire binary, it may send the vector for classification by a classifier (e.g., classifier 660).

According to various embodiments, malware detection process 248 apply the hierarchical model of executable files as follows:

Training Dataset Construction—This may entail malware detection process 248 associating labels (e.g., 'malware' or 'benign') with the vector representations of various executable files for which their labels are already known. Ideally, the training dataset should contain representative samples of several million executables.

Classifier Training—In this phase, malware detection process 248 uses the constructed training dataset to train the multiple instance classifier of choice (e.g., a neural network, as detailed above). In practice, this means repeatedly feeding the training data into the classifier and adjusting its weights, to reach some predefined optimum.

Classifier Testing—Once trained, malware detection process 248 may also test the performance of the classifier, by using the classifier to classify vector representations of further executable files and comparing the results to known labels of those files. For example, if the classifier incorrectly labels a known benign file as 'malware,' this may be counted as a false positive. This performance assessment can be used, for example, to initiate retraining of the classifier or determining that the classifier is ready for use in production.

It is important to stress the importance of the learned weights, because they contain encoded patterns that signify how malicious binaries differ among each other and from benign ones. The learned patterns can be viewed as somewhat akin to signatures used in traditional antivirus engines. Moreover, these patterns can be extracted at different levels of the hierarchy, e.g., instruction model encodes patterns in instruction sequences whereas, for example, the control flow graph model encodes the patterns found in the basic block relations.

Said differently, the whole model of the executable file may look like a predefined transformation of the input data, which reflects the structure of the file. Thus, training may entail training every possible weight in the model/transformation. This is directly related to differentiable programming, which takes an interest in ways to tune parameters of a general computer program given some training data. Neural networks are only one example of such a program, where the tuning is done through the computation of gradients with respects to some weights. More generally, these neural networks can be injected into any (differentiable) program and trained as a whole. However, this requires having to differentiate through that program, which is currently quite a challenge to make computationally feasible.

In the model introduced herein, the program just walks the structure (e.g., FIG. 3A) of an executable file and uses both learned and predefined transformations to compute one number, the verdict. During the training procedure, all of the weights get adjusted according to the data. Generally, every traditional machine learning model is fed by samples, which are represented by one fixed sized vector or matrix. This can be enhanced by differential programming as there are a lot of parameters that have gone into the transformation of the natural structure of the samples into their vector representation.

A key aspect here is the ability to expand machine learning to a new domain even faster. In practice, this approach could even be extended other types of file formats, if encodings from simple structural elements to numerical values are possible. This allows the structure of the file to be represented, be it a graph, tree, recursive tree, or the like.

Figure 7:
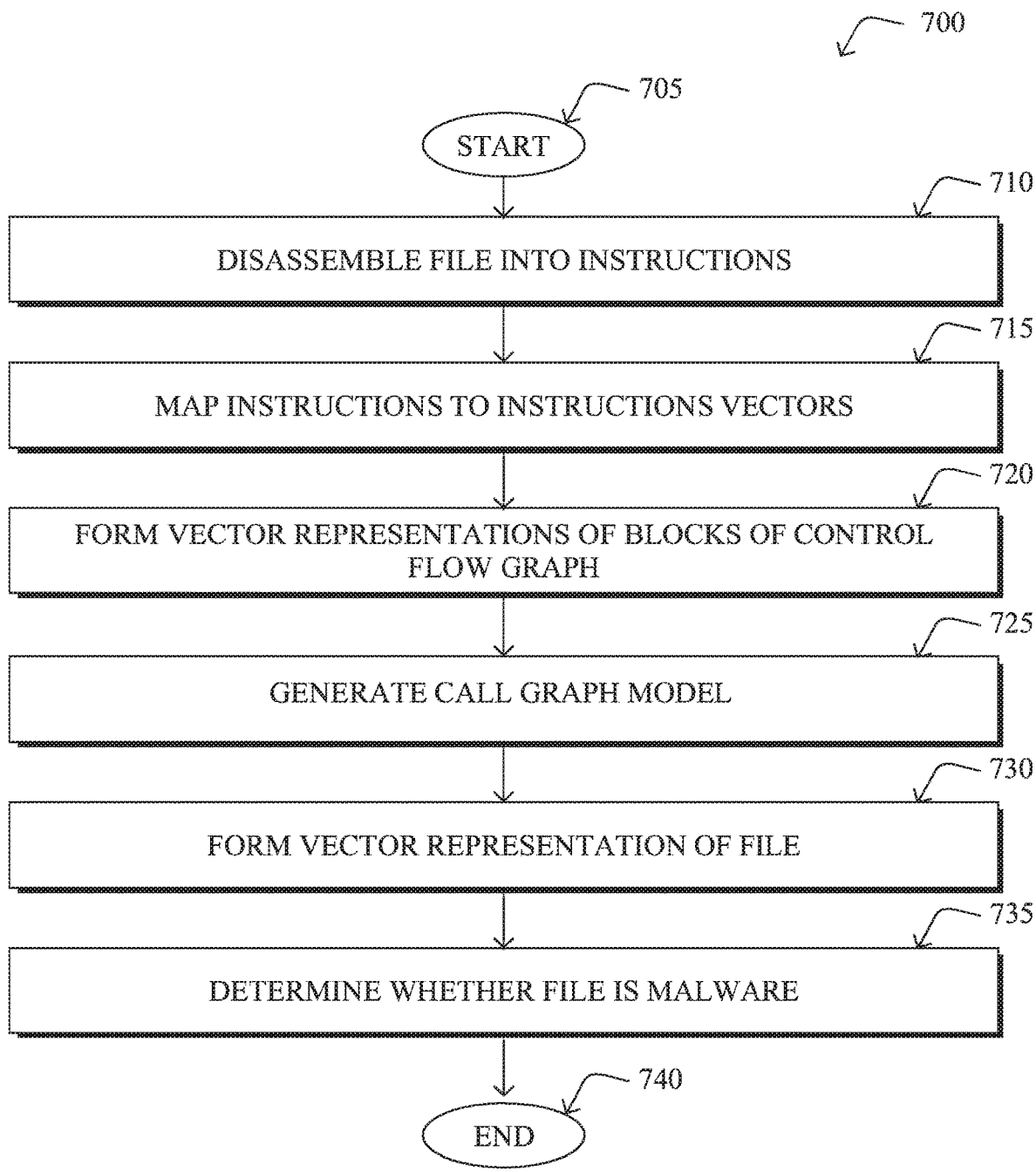
FIG. 7 illustrates an example simplified procedure for detecting malware.

FIG. 7 illustrates an example simplified procedure for detecting malware, in accordance with one or more embodiments described herein. For example, a non-generic, specifically configured device (e.g., device 200) may perform procedure 700 by executing stored instructions (e.g., process 248), to provide a malware detection service to one or more monitored networks. The procedure 700 may start at step 705, and continues to step 710, where, as described in greater detail above, the device may disassemble a file into its assembly instructions.

At step 715, as detailed above, the device may map each of the assembly instructions to a fixed length instruction vector using one-hot encoding and an instruction vocabulary. For example, the device may map a given instruction to its entry in the vocabulary and set the corresponding bit in a vector of length vocabulary_size+1.

At step 720, the device may form vector representations of blocks of a control flow graph for the executable file by embedding and aggregating bags of the instruction vectors, as described in greater detail above. In some embodiments, the device may do so by concatenating the instruction vectors into bags and processing the concatenated vectors using a neural network with aggregation. However, in further embodiments, the device may instead compute a histogram of n-grams using the instruction vectors, to form the vector representations of blocks of the control flow graph. In further embodiments, the device may also combine the instruction vectors with any associated string references or call names from the executable file, to form the vector representations of the blocks.

At step 725, as detailed above, the device may generate a call graph model of the functions of the file. In some embodiments, the device may do so by first constructing a block wrapper for the block representation of a particular block using the vector representations of its incoming and outgoing blocks. In turn, the device may apply its encoding, embedding, and aggregation framework, to form a single vector representation of the control flow graph of the file.

At step 730, the device may form a single vector representation of the executable file based in part on the single vector representation of the call graph model of the executable file, as described in greater detail above. In some embodiments, the device may do so by combining the single vector representation of the call graph model with data regarding a portable executable (PE) header of the executable file and/or a vector representation of the data in the file, such as strings or library calls/imports.

At step 735, as detailed above, the device may determine whether the executable is malware, based on the vector representation of the file. For example, if the hierarchical model of the file is similar to those of a known form of malware, the device may flag the file as malware and initiate a corrective measure (e.g., by blocking traffic that includes the file, quarantining the file, etc.). Procedure 700 then ends at step 740.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of malware using vector representations of files in a hierarchical manner. This allows the system to look not only at the superficial characteristics of a file (e.g., its name, its size, etc.), but also at its inner workings in an intelligent and compact manner.

While there have been shown and described illustrative embodiments that provide for malware detection using executable file hierarchical models, it is to be understood that various other adaptations and modifications may be made within the spirit and scope of the embodiments herein. For example, while certain embodiments are described herein with respect to using certain models for purposes of malware detection, the models are not limited as such and may be used for other functions, in other embodiments. Further, while the techniques herein are described with respect to executable files, the same approach can easily be extended to learn the hierarchical structures of other files, as well. For example, the techniques herein could also be used to model the structure of XML files, PDF files, and other document formats whose payloads could be malicious.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    disassembling, by a device, an executable file into assembly instructions;
    mapping, by the device, each of the assembly instructions to a fixed length instruction vector using one-hot encoding and an instruction vocabulary;
    forming, by the device, vector representations of blocks of a control flow graph for corresponding functions of the executable file by embedding and aggregating bags of the instruction vectors;
    generating, by the device and based on the formed vector representations of the blocks of the control flow graph, a call graph model of the functions in the executable file;
    forming, by the device, a vector representation of the executable file based in part on the call graph model; and
    determining, by the device and based on the vector representation of the executable file, whether the executable file is malware.

2. The method as in claim 1, further comprising:
    initiating a corrective measure when the device determines that the executable file is malware.

3. The method as in claim 1, wherein the device uses a machine learning classifier to determine that the executable file is malware.

4. The method as in claim 1, wherein forming vector representations of blocks of the control flow graph for the executable file by embedding and aggregating bags of the instruction vectors comprises:
    concatenating the instruction vectors into bags; and
    processing the concatenated vectors using a neural network with aggregation.

5. The method as in claim 1, wherein forming vector representations of blocks of the control flow graph for the executable file by embedding and aggregating bags of the instruction vectors comprises:
    computing a histogram of n-grams using the instruction vectors, to form the vector representations of blocks of the control flow graph.

6. The method as in claim 1, wherein forming the vector representation of the executable file based in part on the call graph model of the executable file comprises:
    combining the call graph model with data regarding a portable executable (PE) header of the executable file.

7. The method as in claim 1, wherein forming vector representations of blocks of the control flow graph for the executable file by embedding and aggregating bags of the instruction vectors comprises:
    combining the instruction vectors with any associated string references or call names from the executable file.

8. The method as in claim 1, wherein generating, based on the formed vector representations of the blocks of the control flow graph, the call graph model of the executable file comprises:
    forming the control flow graph using the vector representations of the blocks of the control flow graph by constructing a block wrapper for the particular block using the vector representations of its incoming and outgoing blocks.

9. An apparatus, comprising:
    one or more network interfaces to communicate with a network;
    a processor coupled to the network interfaces and configured to execute one or more processes; and
    a memory configured to store a process executable by the processor, the process when executed configured to:
        disassemble an executable file into assembly instructions;
        map each of the assembly instructions to a fixed length instruction vector using one-hot encoding and an instruction vocabulary;
        form vector representations of blocks of a control flow graph for corresponding functions of the executable file by embedding and aggregating bags of the instruction vectors;
        generate, based on the formed vector representations of the blocks of the control flow graph, a call graph model of the functions in the executable file;
        form, a vector representation of the executable file based in part on the call graph model of the executable file; and
        determine, based on the vector representation of the executable file, whether the executable file is malware.

10. The apparatus as in claim 9, wherein the process when executed is further configured to:
    initiate a corrective measure when the executable file is determined to be malware.

11. The apparatus as in claim 9, wherein the apparatus uses a machine learning classifier to determine that the executable file is malware.

12. The apparatus as in claim 9, wherein the apparatus forms vector representations of blocks of the control flow graph for corresponding functions of the executable file by embedding and aggregating bags of the instruction vectors by:
    concatenating the instruction vectors into bags; and
    processing the concatenated vectors using a neural network with aggregation.

13. The apparatus as in claim 9, wherein the apparatus forms vector representations of blocks of the control flow graph for the executable file by embedding and aggregating bags of the instruction vectors by:

computing a histogram of n-grams using the instruction vectors, to form the vector representations of blocks of the control flow graph.

14. The apparatus as in claim 9, wherein the apparatus forms the vector representation of the executable file based in part on the call graph model of the executable file by:

combining the call graph model with data regarding a portable executable (PE) header of the executable file.

15. The apparatus as in claim 9, wherein the apparatus forms vector representations of blocks of the control flow graph for the executable file by embedding and aggregating bags of the instruction vectors by:

combining the instruction vectors with any associated string references or call names from the executable file.

16. The apparatus as in claim 9, wherein the apparatus generates, based on the formed vector representations of the blocks of the control flow graph, the call graph model of the executable file by:

forming the control flow graph using the vector representations of the blocks of the control flow graph by constructing a block wrapper for the particular block using the vector representations of its incoming and outgoing blocks.

17. A tangible, non-transitory, computer-readable medium storing program instructions that cause a device to execute a process comprising:

disassembling, by a device, an executable file into assembly instructions;

mapping, by the device, each of the assembly instructions to a fixed length instruction vector using one-hot encoding and an instruction vocabulary;

forming, by the device, vector representations of blocks of a control flow graph for corresponding functions the executable file by embedding and aggregating bags of the instruction vectors;

generating, by the device and based on the formed vector representations of the blocks of the control flow graph, a call graph model of the functions in the executable file;

forming, by the device, a vector representation of the executable file based in part on the call graph model; and determining, by the device and based on the vector representation of the executable file, whether the executable file is malware.

18. The computer-readable medium as in claim 17, further comprising:

initiating a corrective measure when the device determines that the executable file is malware.

19. The computer-readable medium as in claim 17, wherein forming vector representations of blocks of the control flow graph for corresponding functions of the executable file by embedding and aggregating bags of the instruction vectors comprises:

concatenating the instruction vectors into bags; and processing the concatenated vectors using a neural network with aggregation.

20. The computer-readable medium as in claim 17, wherein forming vector representations of blocks of the control flow graph for the executable file by embedding and aggregating bags of the instruction vectors comprises:

computing a histogram of n-grams using the instruction vectors, to form the vector representations of blocks of the control flow graph.

* * * * *